(12) United States Patent
Nunally et al.

(10) Patent No.: US 10,021,079 B2
(45) Date of Patent: Jul. 10, 2018

(54) SECURITY SYSTEM, METHOD, AND APPARATUS

(71) Applicant: AWEN LABS, LLC, Carson City, NV (US)

(72) Inventors: Patrick O'Neal Nunally, Escondido, CA (US); Kevin Bostenero, Poway, CA (US)

(73) Assignee: Awen Labs, LLC, Carson City, NV (US)

( * ) Notice: Subject to any disclaimer, the term of this patent is extended or adjusted under 35 U.S.C. 154(b) by 0 days.

(21) Appl. No.: 14/726,556

(22) Filed: May 31, 2015

(65) Prior Publication Data

US 2016/0352709 A1 Dec. 1, 2016

(51) Int. Cl.
*H04L 29/06* (2006.01)
*H04L 9/08* (2006.01)

(52) U.S. Cl.
CPC .......... *H04L 63/061* (2013.01); *H04L 9/0877* (2013.01); *H04L 63/0435* (2013.01); *H04L 63/0442* (2013.01); *H04L 63/08* (2013.01); *H04L 63/0838* (2013.01); *H04L 2209/80* (2013.01)

(58) Field of Classification Search
CPC .................................................... H04L 63/061
See application file for complete search history.

(56) References Cited

U.S. PATENT DOCUMENTS

| | | | |
|---|---|---|---|
| 4,405,829 A | 9/1983 | Rivest | |
| 4,776,011 A | 10/1988 | Busby | |
| 6,122,737 A * | 9/2000 | Bjorn | G06F 21/10 713/186 |
| 6,720,887 B1 * | 4/2004 | Zunti | G08C 17/02 128/903 |
| 6,999,021 B2 * | 2/2006 | Taylor, Jr. | G01V 3/15 342/191 |
| 8,050,881 B1 * | 11/2011 | Yeung | A61B 5/0024 370/503 |
| 8,229,549 B2 * | 7/2012 | Whitman | A61B 1/05 600/407 |
| 9,423,886 B1 * | 8/2016 | Neglur | G06F 3/033 |

(Continued)

FOREIGN PATENT DOCUMENTS

CN 102185694 A * 9/2011
JP 2009267781 A * 11/2009 ......... H04N 1/00681

OTHER PUBLICATIONS

Chan, Haowen, and Adrian Perrig. "Security and privacy in sensor networks." computer 36.10 (2003): 103-105.*

(Continued)

*Primary Examiner* — Shawnchoy Rahman
(74) *Attorney, Agent, or Firm* — Mary Fales; San Diego Patent Prep & Pros, Inc.

(57) ABSTRACT

Systems, apparatuses and methods are described for creating security information using sensors. The security information may be collected independently between at least two devices. The security information may be filtered by communicating portions of the security information between the devices until a statistical match exists. The remaining non-communicated security information on the at least two devices may then be used for any security related applications.

19 Claims, 11 Drawing Sheets

(56) References Cited

U.S. PATENT DOCUMENTS

| | | | | |
|---|---|---|---|---|
| 2011/0010547 A1* | 1/2011 | Noda | ............... | G06F 21/445 |
| | | | | 713/168 |
| 2013/0267794 A1* | 10/2013 | Fernstrom | ............ | G01N 33/02 |
| | | | | 600/301 |
| 2015/0080021 A1* | 3/2015 | Bietz | ............... | H04B 1/3877 |
| | | | | 455/456.1 |
| 2015/0317268 A1* | 11/2015 | Rohrl | ............ | G07D 7/00 |
| | | | | 710/106 |
| 2016/0094344 A1* | 3/2016 | Biswas | ............ | H04L 9/0866 |
| | | | | 726/7 |

OTHER PUBLICATIONS

Newsome, James, et al. "The sybil attack in sensor networks: analysis & defenses." Proceedings of the 3rd international symposium on Information processing in sensor networks. ACM, 2004.*

* cited by examiner

SECURITY SYSTEM, METHOD, AND APPARATUS

BACKGROUND

I. Field

The disclosed embodiments relate to security systems, methods, and apparatuses.

II. Background

Numbers, symbols, and random numbers have many uses in science, engineering, statistics, risk analysis, video gaming, gambling, and other fields. Numbers can be used as codes. For example, your debit card pin number. Symbols may be used for communication. For example, flags used in semaphore. Random numbers can be used for electronic casino games. The casino games contain random number generators which decide the outcome of a game. Mathematically speaking, there are distinctions between numbers, random numbers, pseudo-random, and quasi-random numbers. Random, pseudo-random or quasi-random may be generically referred to as "random" numbers. Truly random numbers are unpredictable. Whereas, pseudo-random numbers, for example, may be predictable if the seed values are know.

A simple method for generating a random number is to take a coin and flip it over and over again. A heads may be a "1" and a tails may be a "0." Obviously, that method is impractical in today's digital age. Another method of generating a random number is by using a software implemented random number generator (RNG). A random number generator, broadly speaking, may take a seed number and run an algorithm to create a fairly random number (pseudo random), but eventually the number will repeat. Another method of generating a random number may be to measure radioactive decay. Another method may be to measure a user's series of mouse movements long enough to create a random number. Varying degrees of the quality of the randomness varies on the application. For example, random numbers generated with an RNG are often sufficient for things like a Monte Carlo risk analysis. However, fields like cryptology require a higher degree of randomness.

Some of the most difficult encryptions to break use randomness in some form. The basic principal being that randomness can increase the amount of computation power, termed the "work factor" by Claude Shannon, needed to decrypt. For example, a well known symmetric key encryption based on randomness is called the Vernam's stream cipher. This cipher can be proven to be secure against any adversary no matter how much computing power is available if correctly implemented.

Needless to say, with the advent of the digital age, the need for robust security and authentication has greatly increased. In conjunction, the complexity of encryption and decryption has also increased. Consumers today engage in many financial transactions online. Sensitive medical information is stored and transmitted electronically. Businesses want to transact negotiations or mergers securely to prevent competitors from knowing. Companies want their employees to be able to log into their networks securely from home. Consumers need to be able to know that their information is secure and that only the intended receiver is viewing the information. Computers can make codes more complex and more difficult to break, but at the same time enabling hackers with powerful code breaking tools.

For example, computer processing power can help break codes through "brute-force." A brute-force attack uses the speed of computers to try each of the variations to find the key. A computer can run through the possibilities much faster than a person could by hand. Protecting the key is also important. If you can get ahold of the key, then you can easily decrypt the message. So methods that send a key or expose parts of the key to third parties are weaker systems. Some codes have been broken because parts of the keys were exposed. So protecting the keys from third party exposure, may help strengthen the code.

Therefore there is a need in the art for a simple and practical way to produce a random number for applications that use them. Moreover, there is a need to create a random number (a.k.a. key) for security applications without exposing the key to other parties. Therefore, there is a need in the art for a security system, method, and apparatus.

SUMMARY

Security systems, methods, and apparatuses are described. In an embodiment of the present application a method for generating security information is described, comprising: initiating sensor data collection for at least two devices, obtaining simultaneous sensor information for the at least two devices, wherein the sensor information is captured according to a collection pattern, and storing the sensor information.

In yet another embodiment of the present application, an apparatus for generating security information is described, comprising: a sensor module comprising at least one sensor, a transceiver module, a control module that initiates simultaneous sensor information collection for at least two devices, wherein the sensor information is captured according to a collection pattern, and a memory module that stores the sensor information.

In another embodiment of the present application a non-transitory computer readable medium encoded with processing instructions, for generating security information is described, comprising: code to initiate sensor data collection for at least two devices, code to obtain simultaneous sensor information for the at least two devices, wherein the sensor information is captured according to a collection pattern, and code to store the sensor information.

BRIEF DESCRIPTION OF THE DRAWINGS

The following embodiments may be better understood by referring to the following figures. The figures are presented for illustration purposes only, and may not be drawn to scale or show every feature, orientation, or detail of the embodiments. They are simplified to help one of skill in the art understand the embodiments readily, and should not be considered limiting.

DETAILED DESCRIPTION

Figure 1:
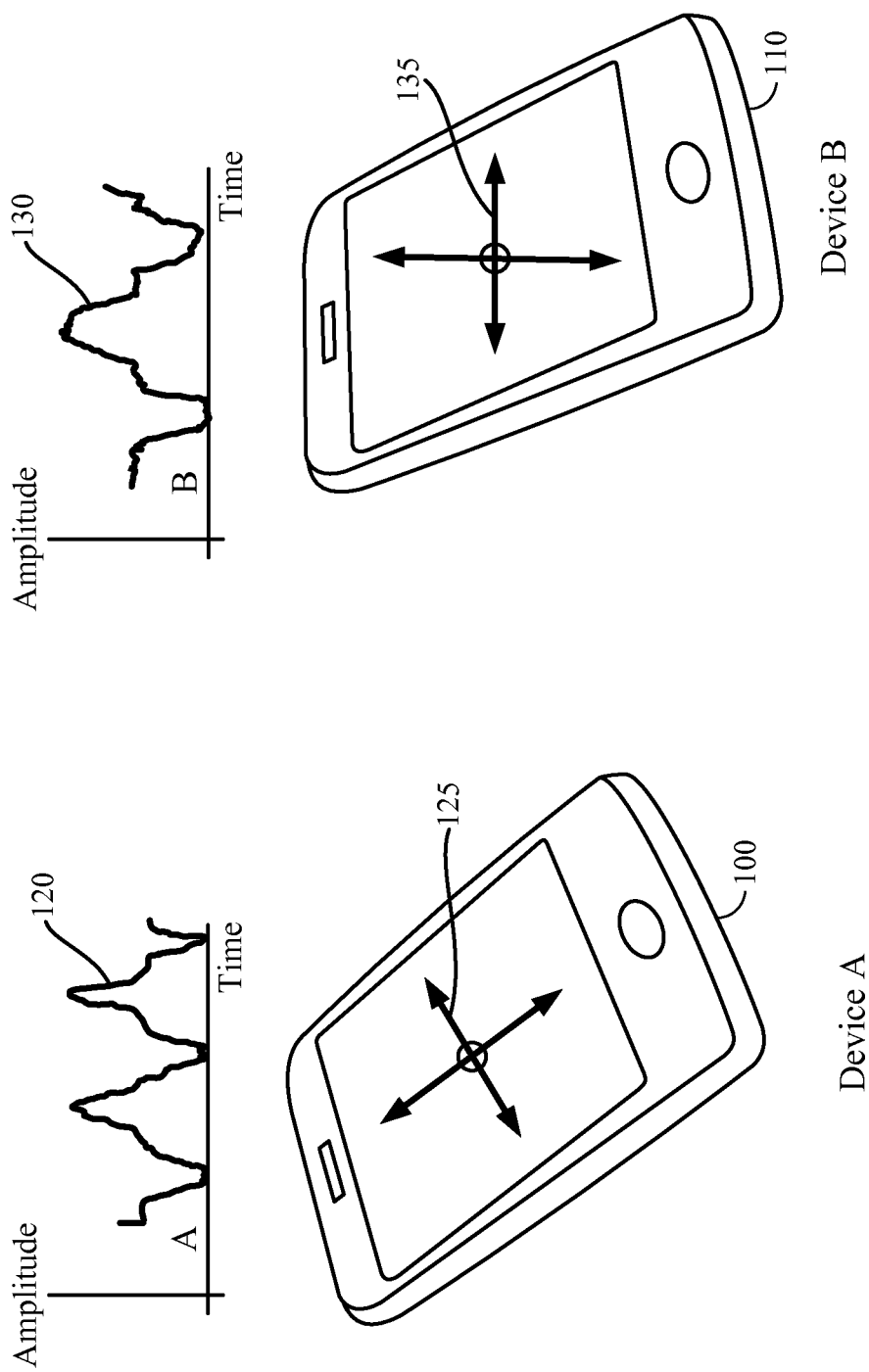
FIG. 1. illustrates two devices collection of sensor data in an embodiment(s).

Each of the additional features and teachings disclosed below may be utilized separately or in conjunction with other features and teachings to provide a security system, method, and apparatus. Representative examples of the following embodiments, will now be described in further detail with reference to the attached drawings. This detailed description is merely intended to teach a person of skill in the art details for practicing the preferred aspects of the teachings and is not intended to limit the scope of the embodiments.

The disclosed embodiments describe security systems, methods, and apparatuses that broadly speaking, may produce a large amount of secure data. They may also produce any amount of secure information. Secure data, secure number, secure information, security data, or security information herein encompasses numbers, binary numbers, bits, analog information before converted into digital form, purely random, pseudo-random, or quasi-random information as is commonly understood in the art. The secure data may be generated so that it isn't exposed to third parties. For example, the secure data may be non-communicated between devices. This secure data may be used for a variety of security applications. For example, the security information may be used for, but not limited to, any application that uses random data, sessions keys, personal/authorization signing, digital signatures, encryption keys, security keys, codes, authentication, access, physical access, system or data access, online access, computer log in, data protection, encryption applications like Advanced Encryption Standard (AES), Data Encryption Standard (DES), One-Time-Pads (OTP), or for any application in which security and/or authentication is desired.

Moreover, in an embodiment, secure information, may be used to encode "plain text." Plain means that the information isn't encrypted. The secure data may be produced without sharing the secure data via communication channels. This may help protect the secure data from third party interception and exploitation for decryption. In an embodiment, the generation of the security information may be independently generated for at least two parties, but any number of parties may be used. Moreover, the data generated between two parties, or by one party, may be used to allow a plurality of parties to securely communicate. In order to simplify the explanation of the embodiments, reference to the two party application will be commonly used throughout, but it should be clear that the embodiments are not limited to two parties. Moreover, "parties" herein may represent the concepts of two separate devices as well as two individuals.

In an embodiment, the parties may use the same secure data that they independently generated with prior agreed protocols to implement a secure system, method, and apparatus. In an embodiment, the security information may be generated independently in a parallel manner between the parties. In an embodiment, the secure information may be generated using a variety and plurality of individual sensor samplings located on, or around, or both on and around party devices. A single sensor may be used or a plurality of sensors may be used. Moreover, the sensors may be used to collect data at staggered times, the same time, or according to a certain collection pattern. For example, the collection pattern could be to collect data from a microphone for a few seconds then collect data from an accelerometer for a few seconds, then collect information from both the microphone and accelerometer at the same time for a minute.

A sensor may include any device or mechanism capable of detecting, measuring, transducing, or recording some physical attribute. For example, a photoresistor is a sensor that detects light and changes its resistance accordingly. The following are examples of commonly used sensors that may be used in the embodiment(s), but this list is not inclusive, any sensor may be used: chemical, detectors, motion, microphones, speakers, cameras, optical, location, accelerometers, angle, audio, biometric, physiological, respiratory, capacitance, density, displacement, distance, electric current, electric potential, energy, force, gravity, gyroscopic, infrared, heart rate, humidity, imaging, level, linear acceleration, light, moisture, magnetic field, navigation, ranging, orientation, photon, position, presence, radiation, radio, speed, thermal, pressure, vector rotation, proximity, voice, speech patterns, phoneme, subatomic particles, temperature, user input, ultrasound, ultraviolet, ultra wideband, usage, vibration, video, or any combination therein.

In an embodiment, collocated devices may collect sensor samples according to the same collection pattern, then filter the collected data so that the devices share the same data. In an embodiment, the filtering may be performed in such a way as to assure that the data in each of the two collocated devices remains non-communicated between the two devices. This may allow the parties to confirm that their common sensor data (or information) is the same without exposing the sensor data to be used for secure communication, authentication, or encryption to anyone eavesdropping on the filtering process.

In an embodiment, the process/es may comprise features that allow for effective data generation even in noisy and/or other less than perfect conditions. In an embodiment, sensors are used to determine what type of environment the devices are in and use that determination to establish a specific collection pattern. In an embodiment, the environment the devices are in is determined and a specific collection pattern is used based on that determination.

In an embodiment the generation process/es may comprise iterative processes for allowing the parties to be sure that the resultant confidential data is in synchronization with each other. This process may involve an initial synchronization followed by resynchronization. The synchronization technique may provide a more stable communication system. In an embodiment, the synchronization technique may communicate least significant values from the sensor samplings until a statistical match exists between the least significant communicated values. The synchronization process may be a type of filtering or verification process.

In an embodiment, parties may securely communicate to each other through the use of the filtered secure data. For example, an encryption technique like Rivest-Shamir-Adleman cryptosystem (RSA) may be used. RSA may use the synchronized security information as a key. In an embodiment, the security information may be used as an encryption/decryption key. In an embodiment, the secure number may be used as a secure one-time-pad (OTP). In an embodiment, the secure data co-sampled may be voluminous and used for a variety of security applications. In an embodiment, the party's devices may be collocated when sampling sensor data independently in each device simultaneously. In an embodiment, the sensor data may be synchronized between the devices by communicating least significant bits or bytes of sensor data. In an embodiment, once the devices are synchronized the remaining most significant bits or bytes which have not been communicated may be used for applications that use secure numbers.

In an embodiment, the filtering (synchronization) of data may be utilized via "wired" techniques between the devices (e.g. USB cable), or wirelessly, for example, with Bluetooth®, WiFi, CDMA, GSM, LTE or other common communication schemes that may pass information between the two devices wirelessly. In an embodiment, once the apparatuses are synchronized using communicated bits/bytes of the secure data, the communicated bits/bytes may then be discarded. Thus, the remaining security information may be non-communicated and unexposed to third parties. Referring now to the figures for more explanation of more embodiments and details of the various embodiments.

Figure 11:
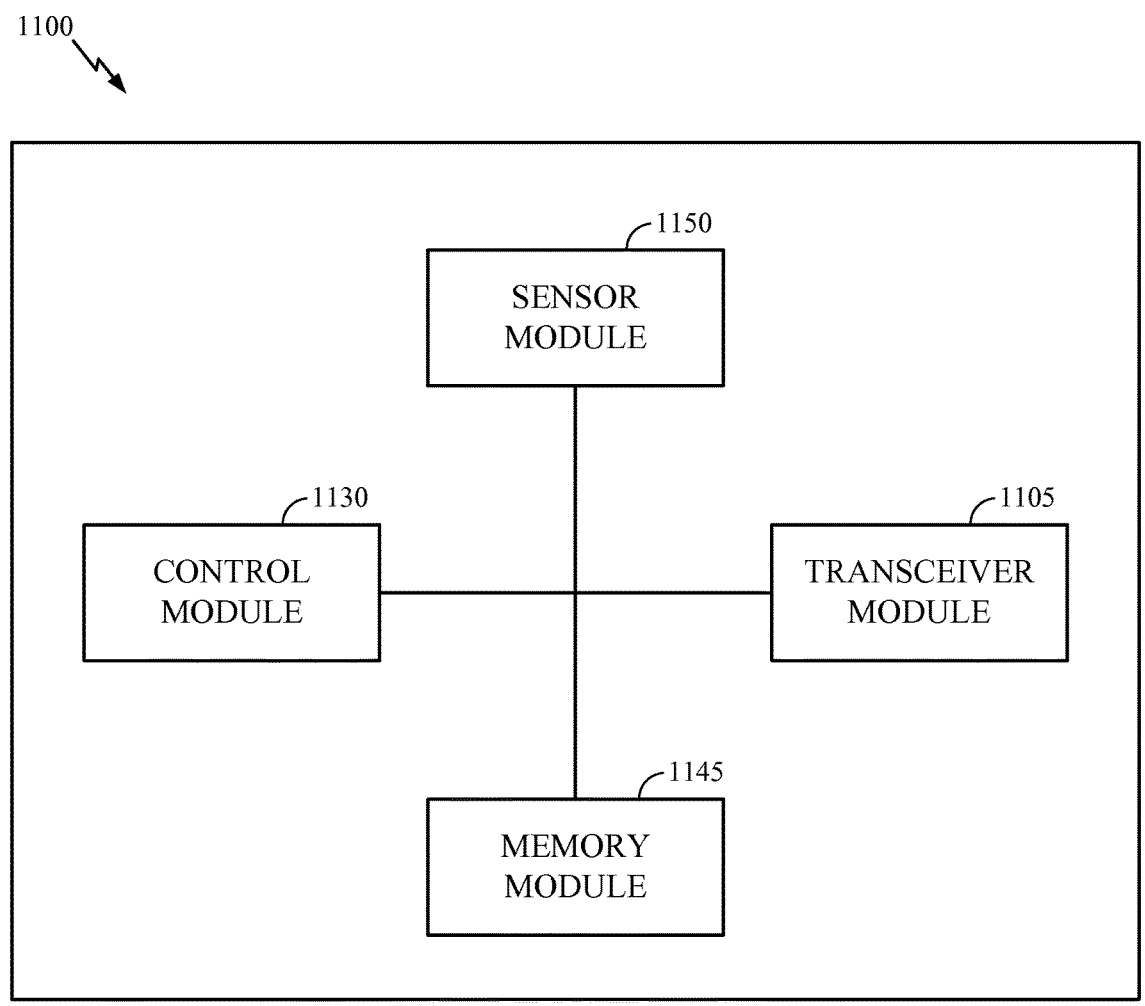
FIG. 11. illustrates a device that may be used for security information generation, synchronization, and communication in an embodiment(s).

FIG. 1 illustrates two devices collection of sensor data in an embodiment(s). As stated previously, two parties are shown for simplicity, but any number of devices may be used in the embodiment(s). As shown in FIG. 1, Party A's user device 100 and Party B's user device 110, are shown collecting sensor data independently with different orientations. A graphic representation 125 (arrows) of the orientation of device A 100 is shown as well as the graphic representation 135 (arrows) of the orientation of device B 110. Party A's user device collection of sensor data is represented graphically 120 and Party B's collection of sensor data is represented graphically 130. As one of skill in the art may recognize, the different orientations of the two devices 100 and 110 may cause the sensor data to be different even if collected simultaneously. The devices A 100 and B 110 are illustrated in FIG. 1 as cell phones, but any type of device capable of collected sensor data, processing data, and with some form of communication capabilities may be used. For example, common devices may include, but are not limited to a laptop, iPod®, iPad®, computer, mobile, tablet, key fob, token, cell phone, smart phone, a device as shown in FIG. 11, or a custom device for the purpose.

FIG. 1 illustrates how two devices may collect independent secure data from sensors, but may not be able to possess the same secure data between themselves due to mismatched orientations. However, in an embodiment, two devices in close proximity with mismatched orientations may still be able to collect sensor data that is almost identical. For example, if microphones are picking up a sound wave from the far field, the only difference between the devices sensor data may be volume level and slight frequency differences at the bandwidth ends. In an embodiment, the sensor data may vary in volume, time, or content, but normalization techniques and filtering techniques as known in the art, may be performed on the data to help reduce any of these variation effects. Depending on the sensors used, device orientation may not be as important in some embodiments. FIG. 3 helps to illustrate an embodiment where device matching orientation may be more important for the data gathering. First, a method of collecting secure data between devices is shown in FIG. 2.

Figure 2:
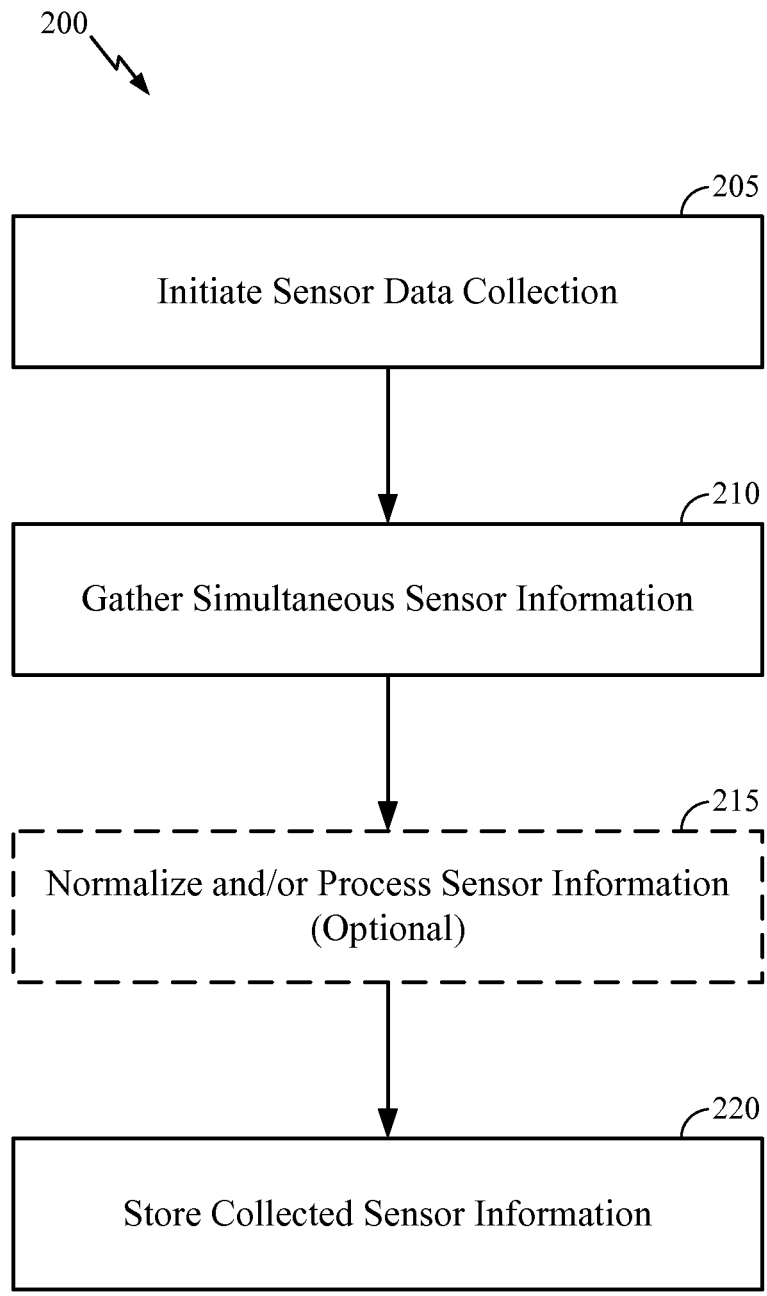
FIG. 2. illustrates a method of collecting sensor data between devices in an embodiment(s).
Figure 3:
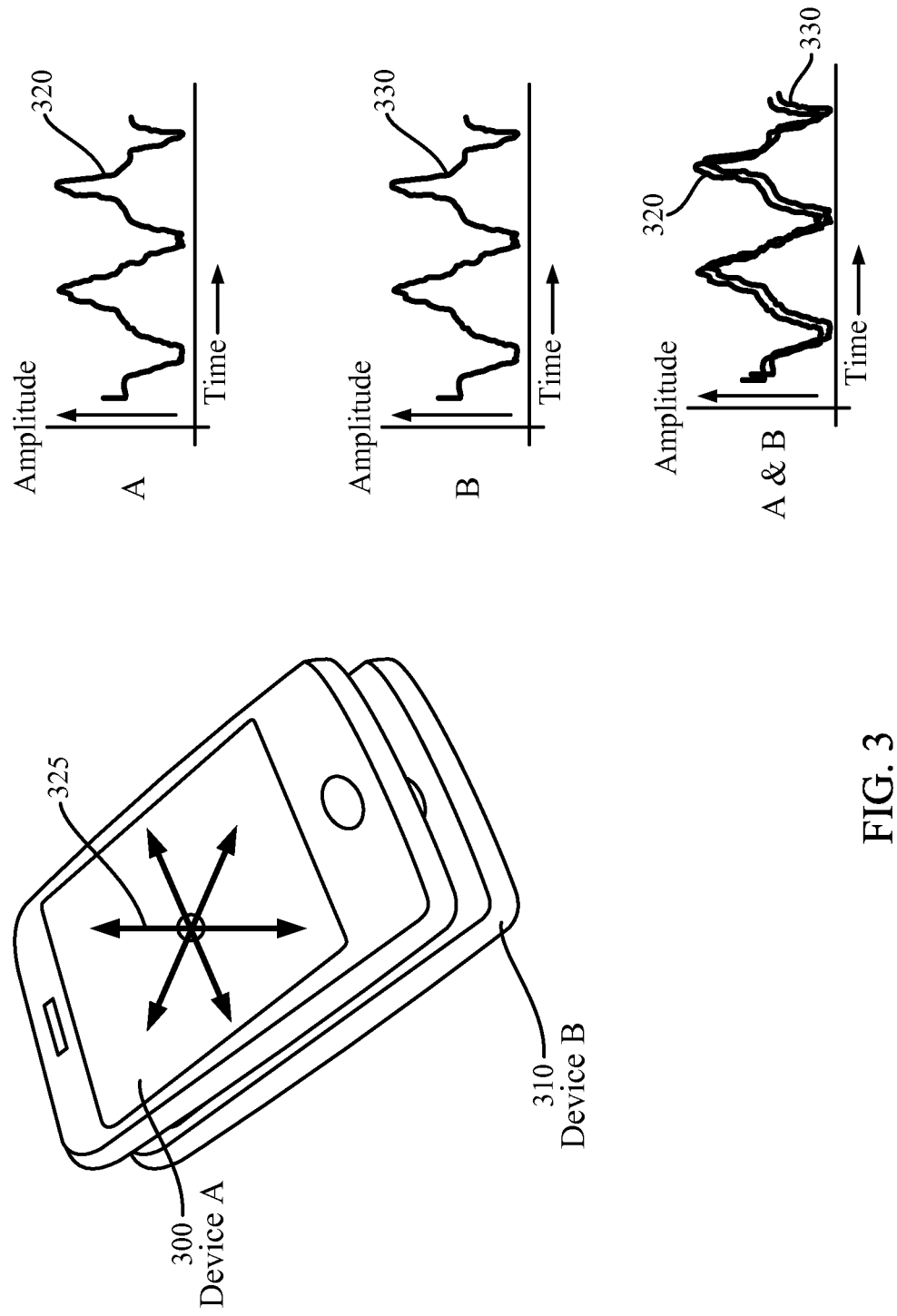
FIG. 3. illustrates two collocated devices collection of sensor data in an embodiment(s).

FIG. 2 illustrates a method 200 of collecting secure data between devices. First, at step 205, a device initiates communication with another device for the independent collection of secure data. Independently means that each device collects its own sensor data. Initiation may be done through application level software, message exchanges, or any pre-arranged protocols. Moreover, any type of communication schemes may be used for this purpose. The devices may use a communication transceiver 1105 as shown in FIG. 11. The communication between the devices may be wired or wireless. The devices may even use some form of magnetic switch or event trigger to initiate the collection. For example, devices may be equipped with Radio-frequency identification (RFID) sensors that have a unique identification (ID) and when the devices read the other's unique RFID tag, then that event may be used to trigger initiation.

Next, the second device receives the initiation request from the first device and acknowledges that it is ready to collect data, or doesn't acknowledge the request and simply begins the collection process as arranged or communicated. The devices may optionally calibrate their sensors before gathering data (pre-collection), or after gathering data (post-collection). The devices at step 210, proceed to collect their sensor data independently using a collection pattern. The collection pattern may be any combination of the type of sensors used, the number of sensors used, the sensor's stimulus, the timing, uses of headers or preambles, conditions to collecting, or any combination therein. The control of the sensors output and input may be accomplished for example with a processor/controller 1130 as shown in FIG. 11. So for example, the collection pattern may be to turn on a vibrator at medium amplitude for four (4) seconds, while simultaneously having an accelerometer record the vibrations, followed by two (2) seconds of powering off the vibrator while still recording. Any number of varieties of collection patterns may be used and are too numerous to list each herein. A collection pattern may comprise any combination of the following: type of sensors used, the number of sensors used, the sensor stimulus, the timing, capture period, which sensors are used to capture data, uses of preambles, or conditions to collecting. In an embodiment, the collection pattern may comprises activating a vibrator in a first device and processing the output of an accelerometer in both the first and a second device in relation to each devices time synchronization: the accelerometer may be sampled the minimum sampling rate useful for time synchronization of data which typically may be less than or equal to twice the maximum component frequency of the vibration frequency. In an embodiment, the collection pattern may use (comprise) a plurality of individual X-axis acceleration sensor samplings, Y-axis acceleration sensor samplings, Z-axis acceleration sensor samplings, audio sensor samplings, magnetometer sensor samplings, geographic positioning sensor samplings, or any combinations thereof.

In an embodiment, the devices may agree ahead of time to send out some form of a preamble or header that may be used to determine the beginning of the sensor collection such as the vibration pattern previously discussed. The use of preambles or headers may be considered part of the collection pattern or part of the initiation. For example, mobile device A may communicate with mobile device B that collocated sensor gathering is about to take place and indicate to B to wait for the preamble to begin capturing. In an embodiment, the preamble may be a white or pink noise burst, a burst of on/off noise, a 1 kHz tone, a fast vibration stimulus, or any identifiable pattern that the devices may recognize as separate from the secure sensor input. The devices may use the preamble to know when to start capturing the secure sensor information. The devices may capture sensor data during a capture time period. This type of arrangement may help in reducing any processing delay errors that are different between the devices. It may also help efficiently use of memory. For example, rather than filling up memory with sensor data before the preamble, the devices would capture data starting at the synchronized time.

In an embodiment, the starting point of the collection may be based upon an event trigger. In an embodiment, the collection pattern includes a synchronized starting point. For example, the devices collection pattern may use a preamble (or header) to mark the beginning of the collection data. In another embodiment, the collection may be triggered (starts) after an agreed time period. In another embodiment the collection begins when a motion may be detected in a certain direction and amplitude. In an embodiment, the devices are collated together during the collection period. Collocated means that the devices are within the same environment (e.g. same room, lying on the same table, held in same user's hand, held by the same mechanism, or the like) and near enough to each other that sensory input may be common to both. Next, at step 215, which is an optional step, the data from the sensors (sensor information) may be raw, normalized, filtered, or processed. Finally, at step 220, the devices store their independently collected secure data. The devices may use a form of memory 1145 for storing the data as shown in FIG. 11. The memory 1145 may be external or internal, or both external and internal to the devices. The stored secure data (security information) may be filtered, synchronized, processed, or raw.

FIG. 3 illustrates two collocated devices collection of sensor data in an embodiment(s). As shown in FIG. 3, the devices 300 and 310 are brought into close proximity and orientation with respect to each other. Specifically, device A 300 and device B 310 may be "laid" on top of each other producing an orientation 325 that may be effectively the same. In an embodiment, the device's user interface (UI) may display a graphical representation of the device's orientations such that a user may manually adjust the devices orientations to be similar. In an embodiment, the devices may share orientation information (or sensor information) for calibration or data normalization. For example, A's device 300 may indicate that it's pointing due North, but B's device 310 may be indicating that it is pointing Northeast. The devices may use this information to offset their data as a form of sensor calibration before the collection begins or after collection during a post filtering process.

In an embodiment(s), each device may independently gather sensor information which approximates the other's independently gathered sensor information. For example, the collection pattern may include accelerometers measuring the shaking of two collocated devices for the secure data collection. In an embodiment, a user may shake the devices as sensor input. As shown in FIG. 3 the sensor data collected independently from device A 320 may be approximately the same as that collected for device B 330. In an embodiment, the amount of secure data collected may be large in volume. In an embodiment, the amount of data collected may be between 512 kB and 128 GB. In another embodiment, the data may be less than 512 kB for use of keys or pin codes. In an embodiment, the data collected may fit into standard sized memory sizes like flash chips/cards: e.g. 8 GB, 16 GB, 32 GB. The amount of security data to collect and store varies with the application and device capabilities. The independent secure data collected by the devices may have the same information in the upper bits/bytes, but may be mismatched in the lower bits/bytes. This effect, as one of skill in the art readily understands, may be due to the nature of how analog data is converted into digital form. The data may be synchronized (filtered) to ensure that the data that may be used by the devices for secure communication matches in the upper significant bits/bytes. Upper bits/bytes means the higher significant portions of a number and lower bits/bytes means the least significant portions of a number.

In an embodiment, a single device may be used to generate (collect) the secure number or data and share it with another device(s). For example, a device such as the one shown in FIG. 11 may gather sensor information and store the information as a number, information, or data in memory. This number may be a large secure number. In an embodiment, the device may transfer the number to other devices to be used for secure communication between themselves. In an embodiment, the device may transfer the secure number or data to the other devices via a removable memory device such as a thumb drive, via a wired connection, or via a wireless connection. In an embodiment, a single device may be used to generate the secure information and use the secure information for personal security applications, like encrypting a personal hard drive.

Figure 4:
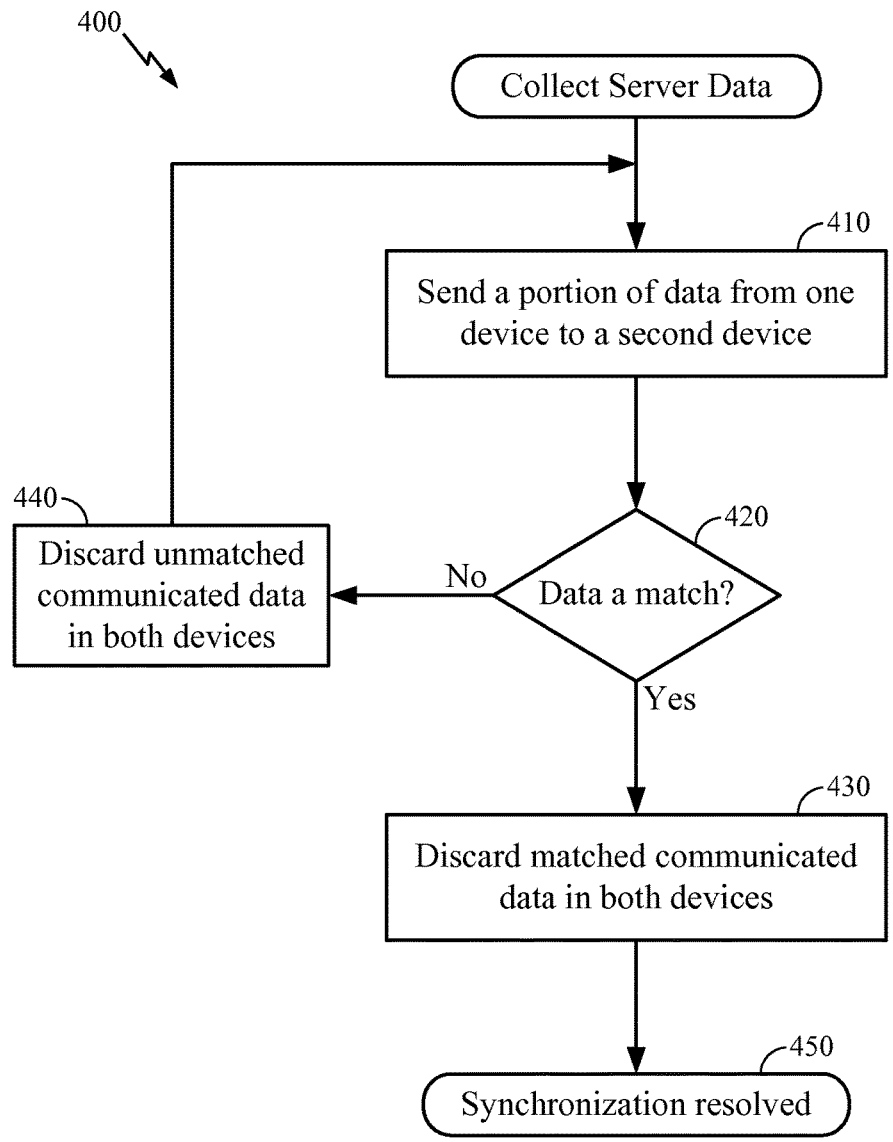
FIG. 4. illustrates a synchronization method in an embodiment(s).

FIG. 4 illustrates a synchronization method 400 in an embodiment(s). First, the devices independently collect approximately the same sensor information as discussed. This step may have been done prior to the synchronization method 400. The collected sensor information may be a statistical match. A statistical match, herein, refers to the characteristics of the data being a match at a macro or micro level, but not necessarily an exact match. For example, as explained below, the least significant bits of the data may not exactly match, but the rest of the data would. Filtering or synchronization of the data may be preformed to obtain an exact match. The collected sensor information may be raw, normalized, processed, filtered, or any combination therein. Next, in step 410, one of the devices sends a portion data to the other device. This data may be the independently secure information that was collected and/or raw, normalized, processed, or filtered. In an embodiment, this data may be one or more portions of the least significant bit information to another user device. In another embodiment, the data sent may be bits selectively chosen from specific bit places. For example, the first four bits, every other bit, or the fourth least significant byte. In an embodiment, data may be taken from the upper two-thirds portion of the data while the lower third may be discarded. Any combination of bit/ byte exchange may be used so that the two devices may agree on whether or not they have the same secure data. Depending on how quickly the devices want to synchronize and how much secure data they want for secure communications later, they may agree on different patterns of bits/ byes to send. For example, exchanging the lower ordered bits may take more time to synchronize than exchanging higher ordered bits, but may preserve more secure data to use. In step 420, the sent data may be compared to the receiver's data to determine if it is equivalent. If the data is equivalent (a match), the process goes to step 430. At step 430, the match is communicated between the devices and the communicated data is discarded. A match confirmation may be communicated by way of an acknowledgement, message, or a bit flag. Process 400 or steps 410-430 may be completed (repeated) as many times as desired and/or needed to guarantee synchronization between the devices. Once the devices agree that the synchronization is resolved, in step 450 the process ends, and the remaining non-communicated secure data may be securely used by the devices for any security application. At step 420, if the data is not equivalent (not a match), then at step 440, this is communicated between the devices and this inconsistent communicated information is discarded and the process starts again at step 410.

Figure 5:
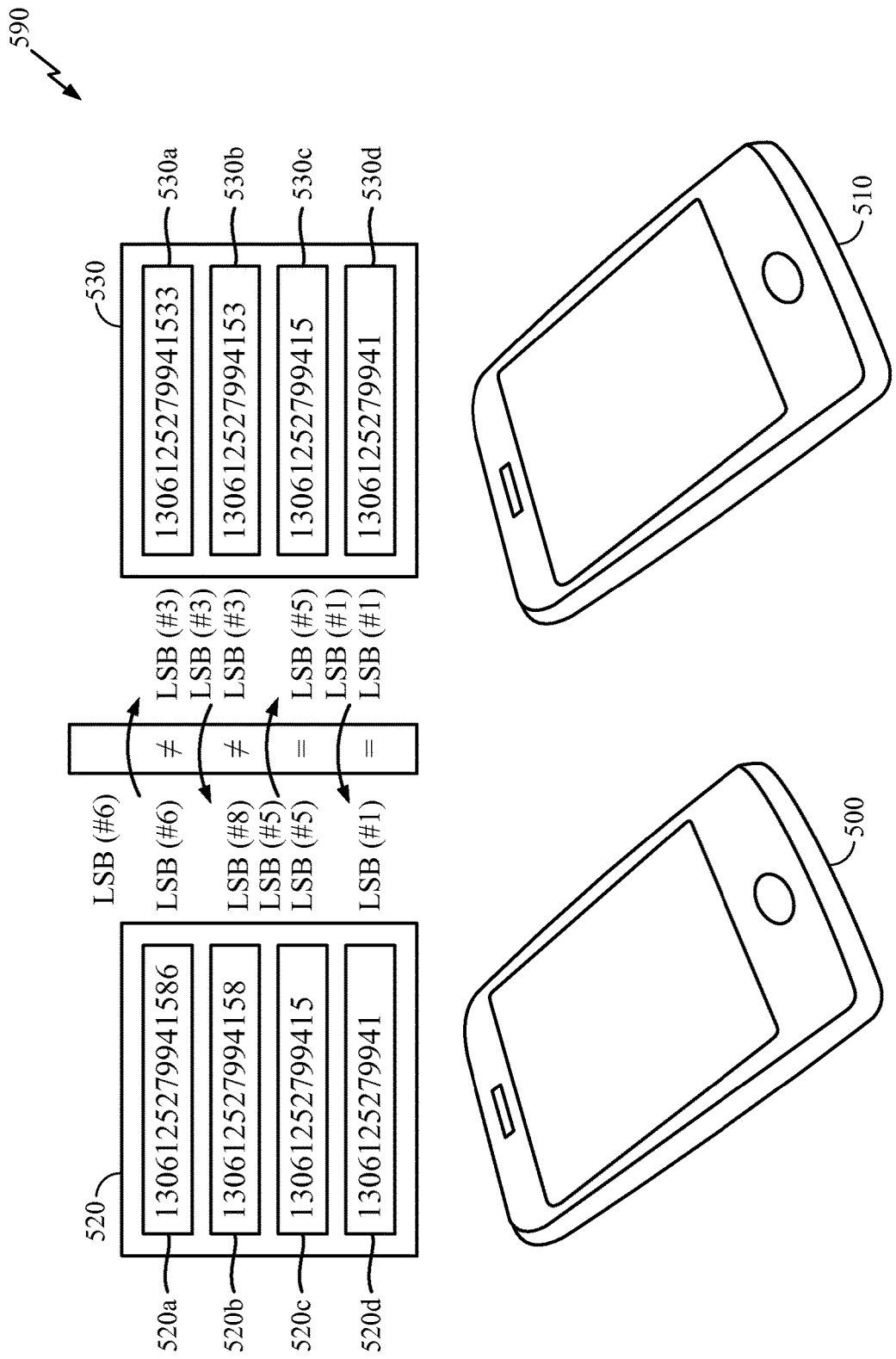
FIG. 5. illustrates a synchronization method, using devices as shown in FIG. 11, using the least significant bits in an embodiment(s).

FIG. 5 illustrates a synchronization method 590, using devices as shown in FIG. 11, using the least significant bits in an embodiment(s). As shown in FIG. 5, A's apparatus 500 and B's apparatus 510 have independently gathered sensor information in close proximity. A's sensor information independently gathered is shown in table 520 while B's is shown in table 530. The tables are shown for simplicity of illustration, and as one of skill in the art can readily understand the actual data may be voluminous and be stored or represented in a variety of manners, for example, but not limited to, an array, matrix, data structure, tables, lists, bits, bytes, or memory locations. Applying a process like that of FIG. 4, A's apparatus 500 sends the least significant information "6" as shown in 520a to B's apparatus 510. When B's apparatus 510 determines the least significant information of "6" from 520a is inconsistent with its "3" in 530a then B's apparatus 510 discards that information and sends an indication of the inconsistency to A's apparatus. Then B's apparatus sends its next least significant information "3" shown in 530b to A's apparatus 500. When A's apparatus 500 receives indication of the previous inconsistency it discards the last information it sent ("6") and evaluates consistency with the least significant information 420b that B's apparatus sent. Then A's apparatus 500 determines the least significant information of "3" 520b sent by B's apparatus is inconsistent with its "8" in 520b. A's apparatus 500 discards that information ("8") and sends an indication of the disparity to B, and sends its next least significant information "5" shown in 520c to B's apparatus 510. When B's apparatus 510 receives indication of the previous disparity it discards the last information it sent ("3") and in this case determines the least significant information "5" of 520c is consistent with its own "5" in 530c. B's apparatus 510 then discards that information "5" and sends an indication of the consistency (match) to A's apparatus 500. B's apparatus 510 then sends its next least significant information "1" shown in 530d to A's apparatus 500. When A's apparatus 500 receives indication of the previous consistency it discards the last information "5" it sent and determines the least significant information "1" from 530d is consistent to its own "1" in 520d. A's apparatus 500 then discards that information "1" and sends an indication of the consistency to B's apparatus 510 which then discards the last information it sent "1" and the process is complete if the devices are satisfied that the remaining non-communicated security information they have is a match. A's apparatus 500 and B's apparatus 510 may now use the remaining secure data "130612527994" that has been non-communicated between themselves for secure applications. The example provided in FIG. 5 is one embodiment, but the synchronization may be done in a variety of manners.

For example, in an embodiment, rather than B send a response (indication) to A that A's number "6" 520a isn't consistent with B's number "3" 530a, B could simply send its number "3" 530a to A for A to determine whether it's a match or not (and vice versa). In an embodiment, A may send a "6" 520a to B. B may respond with a bit flag of "1" or "0" that indicates a match or not to A (indication and not data portion exchange). If for example, B responds to A that A's "6" 420a isn't a match with a "1," then A sends the next number to B of "8" 420b. B then may respond to A with another "1" indicating no match, and so on, until B may respond with a "0" when A sends "5" 420c.

The system, method, and apparatus described in the embodiment(s) may be used for a variety of applications. In an embodiment, the secure data may be used to encrypt and decrypt data. In an embodiment, the secure information may be used to encrypt hard drives, files, disks, folders, thumb drives, external memory devices, emails, voice, text messages, personal data, databases, medical information, bank accounts, bank information, or any application where privacy of information may be desired. In an embodiment the security information may be used as an encryption key, a vehicle key, a session key, a password, access key, an electronic car key, a key fob, a digital signature, a digital seal, or to authenticate the sender (author). The embodiment(s) may be used between peers as in a peer-to-peer communication, as security for wireless networks (WiFi, WLAN, PANs, or the like), by a group of users or digital community, for base station accessing or device paring, for upper or MAC layer security and accessing protocols, or any application were security, and/or authenticity may be desired.

Figure 6:
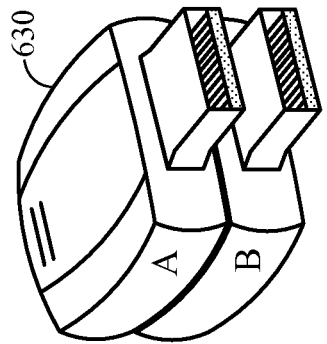
FIG. 6. illustrates a fob device in an embodiment(s).
Figure 6:
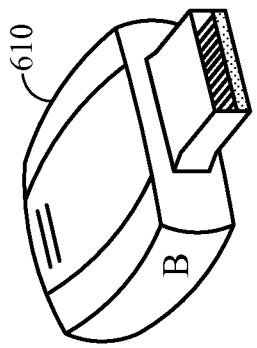
Figure 6:
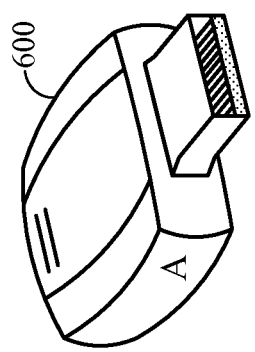

FIG. 6 illustrates a fob device in an embodiment(s). Key fob like devices 600 and 610 may be collocated together as shown in 630 to collect the security information. The fobs may collect data as shown in FIG. 2. The fobs may synchronize data as shown in FIG. 4. The fobs may be manufactured and sold as pairs. The fobs may be sold "blank" with no secure data on them. If the fobs are "blank" that just means no secure data was collected, filtered, or stored on them. The fobs may comprise applications, software, sensor module, control module, transceiver module, memory module, or the like as shown in FIG. 11. The fobs may be manufactured and sold pre-loaded with secure data. In an embodiment, more than one fob may be collocated. For example, a family may wish to purchase a pack of fobs that all have the same pre-loaded secure data on them. The package of fobs may be manufactured or designed such that only those fobs may collect, synchronize, and store security information. For example, a group may want to purchase a package of blank fobs that can only be used with each other for security applications. In other words, a fob from group A, can't pair with a fob sold in another group. This may be convenient for companies who wish to distribute fobs to employees for things like online secure access. In an embodiment, a plurality of fobs are collocated and paired prior to selling. In an embodiment, the devices 600 and 610 may have a physical (wired) bus interface that connects to each other to perform synchronization as well as being used for communicating to other external devices through standard protocols. In another embodiment, the devices 600 and 610 may have a wireless connection.

In an embodiment, the fobs may have a RFID tag or some mechanism that triggers when they're in close proximity to each other that communicates that the devices want to generate secure data. For example, a magnetic switch may be located between them, such that when one comes close to the other, the switch input may inform a processor to began the pairing process. The fobs may comprise sensors that are pre-calibrated (e.g. at manufacturer), or they may have the capability to calibrate later (e.g. by consumer). In an embodiment, the fobs may be used for, but not limited to, any application that uses secure data, vehicle keys, sessions keys, personal/authorization signing, access keys, digital signatures, encryption keys, security keys, authentication, access, physical access, system or data access, online access, computer log in, data protection, encryption applications like Advanced Encryption Standard (AES), Data Encryption Standard (DES), One-Time-Pads (OTP), or for any application in which security and/or authentication may be desired.

Figure 7:
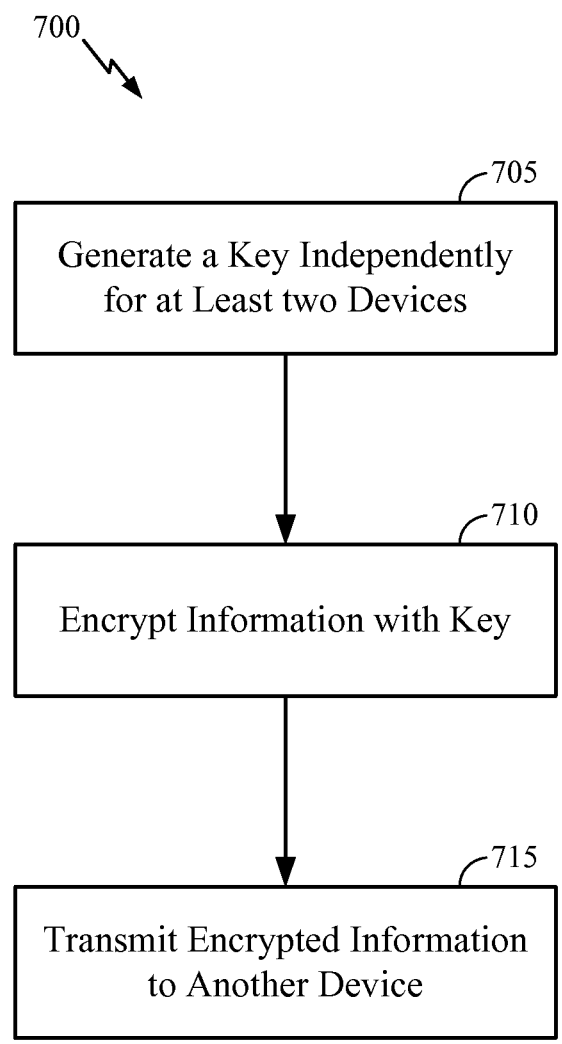
FIG. 7. illustrates an encryption method using security information in an embodiment(s).

FIG. 7 illustrates an encryption method 700 using security information in an embodiment(s). In an embodiment, the independently collected security information as described in the various embodiments, may be used for encrypting data. At step 705, a key may be generated for at least two devices. The key may be created based upon the security information that was independently collected for the at least two devices. At step 710, a device encrypts the "plain" information with the key. Any number of known or new encryption techniques may be used for this step. For example, encryption may be done via one-way-math-functions, Advanced Encryption Standard (AES), Data Encryption Standard (DES), or One-Time-Pads (OTP). Finally, at step 715, the encrypted data (cipher information) may be transmitted to another device. The other device that receives the encrypted data (information) from step 710, may be one of the at least two devices that generated the security information independently from step 705.

Figure 8:
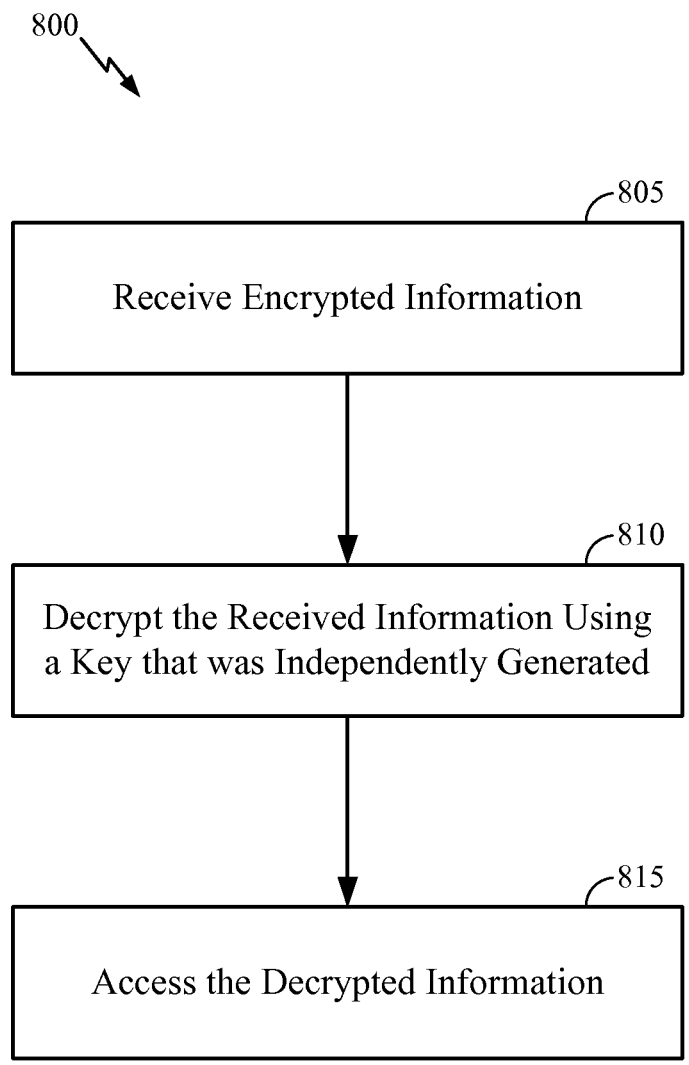
FIG. 8. illustrates a decryption method using security information in an embodiment(s).

FIG. 8 illustrates a decryption method 800 using security information in an embodiment(s). At step 805, a device receives encrypted information from another device. The receiving device may be one of the at least two devices that generated the security information independently as described in the various embodiments. The information may have been encrypted with any number of known or new encryption techniques. For example, encryption may be done via one-way-math-functions, Advanced Encryption Standard (AES), Data Encryption Standard (DES), or One-Time-Pads (OTP). At step 810, the receiving device then decrypts the encrypted information using a key. The key may be created based upon the security information that was independently collected for the at least two devices. Then finally, at step 815, the receiving device may view or access the decrypted information.

Figure 9A:
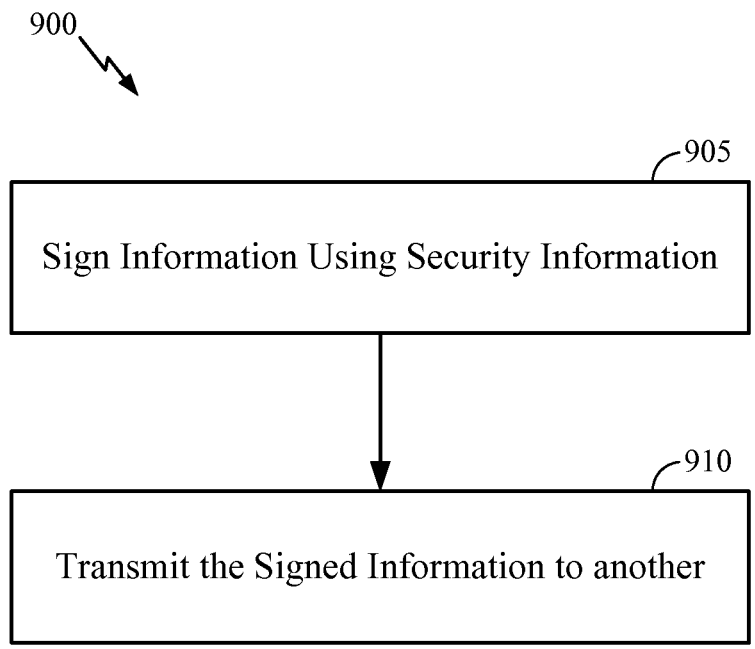
FIG. 9A. illustrates authentication methods using security information in an embodiment(s).
Figure 9B:
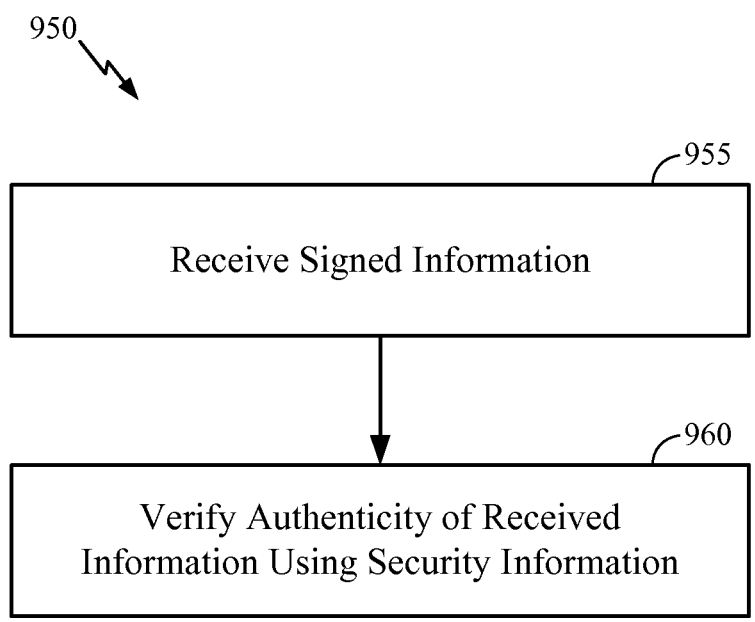
FIG. 9B. illustrates authentication methods using security information in an embodiment(s).

FIGS. 9A and 9B illustrates authentication methods 900 and 950 using security information in an embodiment(s). In FIG. 9A at step 905, information may be signed using the security information. The signing information may be, but is not limited to, document, email, text message, certification, digital certification, file, transaction, and message. In an embodiment, the signature that is signed is a digital signature. The security information may be the independently generated security information for at least two devices as described in the various embodiments. At step 910, the signed document may be transmitted to another device.

In another embodiment, method 950 is described. In FIG. 9B the signed information from step 905 may be received at another device at step 955. The receiving device at step 960, may then verify the authenticity of the signed information by comparing the digital signature with its own security information. The signed information may be, but is not limited to, document, email, text message, certification, digital certification, file, transaction, and message. In an embodiment, the signature that is signed is a digital signature.

In another embodiment, a fraud-deterrent process is described. A document may be presented as an article in which parties would like to memorialize as trusted. Each party may use a device as shown in FIG. 11. Each party's devices may have generated security information independently as described in the various embodiments. The first device may be used to uniquely image the document. For example, the document may be photographed by the device. The second device may also uniquely image the document. The separate images may capture the document image under different parameters (i.e., angles, focal length, field of view, or the like). The resulting images may be different from each other while still representing the same document information. These images may then be used to securely construct a common image using a private key (derived from security information previously independently generated), the differences between the two unique images containing common content, or a signor's device identifier. For example, a device identifier may be a Mobile Station International Subscriber Directory Number (MSISDN). When the common image is complete, each device may contain a secure document that can be validated using a public key to recover the representation of the two unique images of the common document and the identifying data.

Figure 10:
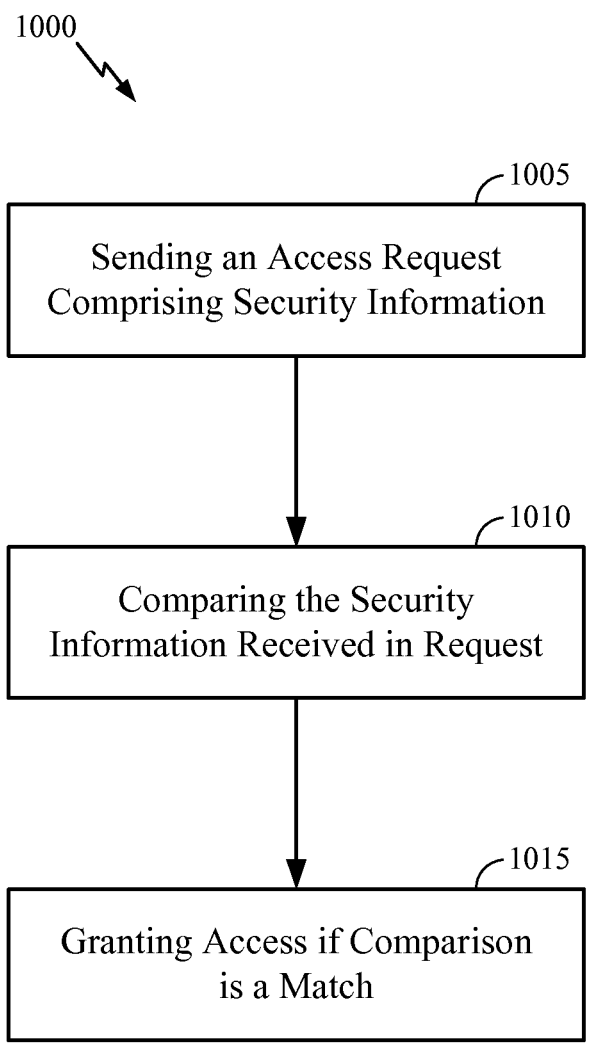
FIG. 10. illustrates an access method using security information in an embodiment(s).

FIG. 10 illustrates an access method 1000 using security information in an embodiment(s). Security information may be the independently generated for at least two devices as described in the various embodiments. At step 1005, a device may send a request for access to another device. The device may want to request access, either logically or physically. For example, a device may be a key fob requesting access to a vehicle door. In another example, the device may be computer running an application that is trying to access a hard drive. The device may send a request for access to the other device along with a portion of security information. At step 1010, the receiving device that receives the request for access and the accompanying security information may compare its version of security information to that of the received version. At step 1015, if the versions match, then the device grants access. If the versions do not match, then the device denies access.

FIG. 11 illustrates a device 1100 that may be used for secure data generation, synchronization, or secure applications in an embodiment(s). In an embodiment, device 1100 comprises a control module. The control module may comprise a processor or controller 1130 and other related circuitry. There may be more than one processor or controller. The processor or controller may be coupled to a form of memory. The memory may be external, internal, or a combination of both. The memory and any related circuitry may be included in the memory module 1145. Device 1100 may also have a communication transceiver module 1105 that may send wired or wireless communications to and from the device. The transceiver module 1105 may include more than one type of communication scheme receiver and transmitter and any related circuitry. For example, transceiver module 1105 may comprise a PAN as well as a CDMA receiver and transmitter. In an embodiment, transceiver module 1105 includes an RFID tag, some type of switch, or detector that may be used as a form of communication. Device 1100 may have a sensor module 1150. The sensor module 1150 may comprise at least one sensor and any related circuitry that may output and/or input sensor information. It may comprise a plurality of sensors. Device 1100 may be used in any of the embodiments described herein. Device 1100 may have other components as is commonly known in the art. For example, device 1100 may also have a touch screen, antennae, keypad, buttons, power source, battery, or the like. Device 1100 may be a smart phone, laptop, a mobile, key fob, or any suitable device as is commonly known in the art.

In other embodiments, the processing modules may be implemented using a shared processing device, individual processing devices, or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

The described embodiments or any part(s) or function(s) thereof, may be implemented using hardware, software, or a combination thereof, and may be implemented in one or more computer systems or other processing systems. A computer system for performing the operations of the described embodiments and capable of carrying out the functionality described herein may include one or more processors connected to a communications infrastructure (e.g., a communications bus, a cross-over bar, or a network). Various software embodiments are described in terms of such an exemplary computer system. After reading this description, it will become apparent to a person skilled in the relevant art(s) how to implement the embodiments using other computer systems and/or architectures.

The foregoing description of the preferred embodiments has been presented for purposes of illustration and description. It is not intended to be exhaustive or to limit the embodiments to the precise form or to exemplary embodiments disclosed. Obviously, many modifications and variations will be apparent to practitioners skilled in this art. Similarly, any process steps described might be interchangeable with other steps in order to achieve the same result. The embodiments were chosen and described in order to best explain the principles of the embodiments and its best mode practical application, thereby to enable others skilled in the art to understand the various embodiments and with various modifications as are suited to the particular use or implementation contemplated. It is intended that the scope of the embodiments be defined by the claims appended hereto and their equivalents. Reference to an element in the singular is not intended to mean "one and only one" unless explicitly so stated, but rather means "one or more." Moreover, no element, component, nor method step in the described disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . ."

In addition, the conjunction "and" when used in the claims is meant to be interpreted as follows: "X, Y and Z" means it may be either X, Y or Z individually, or it may be both X and Y together, both X and Z together, both Y and Z together, or all of X, Y, and Z together.

It should be understood that the figures illustrated in the attachments, which highlight the functionality and advantages of the described embodiments, are presented for example purposes only. The architecture of the described embodiments are sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the described embodiments in any way. It is also to be understood that the steps and processes recited in the claims need not be performed in the order presented.

Also, it is noted that the embodiments may be described as a process that is depicted as a flowchart, a flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed. A process may correspond to a method, a function, a procedure, a subroutine, a subprogram, or the like. When a process corresponds to a function, its termination corresponds to a return of the function to the calling function or the main function. A process or method may be implemented with a processor, or similar device, or any combination of hardware and software.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices. Moreover, a micro processor, or similar device may have internal or external memory associated with it.

The various features of the embodiments described herein may be implemented in different systems without departing from the embodiments. It should be noted that the foregoing embodiments are merely examples and are not to be construed as limiting the embodiments. The description of the embodiments is intended to be illustrative, and not to limit the scope of the claims. As such, the described teachings may be readily applied to other types of apparatuses and many alternatives, modifications, and variations will be apparent to those skilled in the art.

What is claimed is:

1. A method for generating an encryption key, comprising:
    initiating simultaneous sensor information collection for at least two devices, the at least two devices are collocated, the simultaneous sensor information is captured according to a collection pattern; and
    obtaining simultaneous sensor information for the at least two devices, the simultaneous sensor information for the at least two devices is captured independently for each device, the simultaneous sensor information is independently stored at each device, the simultaneous sensor information used for security purposes is not communicated between the two devices;
    creating an encryption key based on the non-communicated simultaneous sensor information; and
    using the encryption key to securely communicate between the at least two devices.

2. The method of claim 1, wherein the collection pattern comprises any combination of the following: type of sensors used, number of sensors used, sensor stimulus, measuring sensors, timing, capture period, uses of preambles, and conditions to collecting.

3. The method of claim 2, wherein the collection pattern comprises a preamble of activating a vibrator;
    processing an output of an accelerometer; and
    wherein the processing of the accelerometer output data comprises synchronization of time between two devices.

4. The method of claim 1, wherein the at least two devices have similar operations.

5. The method of claim 2, wherein the sensor is at least one of a: smoke detector, carbon monoxide detector, mobile device, motion sensor, sound, camera, microphone, optical sensor, location, acceleration, angle, audio, biometrics, physiological, respiration, capacitance, density, displacement, distance, electric current, chemical, electric potential, energy, force, gravity, gyroscopic, infrared, heart rate, humidity, imaging, level, linear acceleration, light, moisture, magnetic field, navigation, ranging, orientation, photon, position, presence, radiation, radio, speed, thermal, pressure, vector rotation, proximity, voice, speech patterns, phoneme, subatomic particles, temperature, user input, ultrasound, ultraviolet, ultra wideband, usage, vibration, or video.

6. The method of claim 1, wherein the simultaneous sensor information is normalized.

7. The method of claim 1, wherein the simultaneous sensor information is used for: an application that uses secure data, sessions keys, authorization, personal signing, digital signatures, security keys, authentication, access, physical access, system or data access, online access, computer log in, data protection, encryption, decryption, Advanced Encryption Standard (AES), Data Encryption Standard (DES), Public Key Infrastructures (PKI), or One-Time-Pads (OTP).

8. The method of claim 1, further comprising:
synchronizing the stored simultaneous sensor information until a match exists between the simultaneous stored sensor information for the at least two devices.

9. The method of claim 1, wherein the initiating comprises transmitting a preamble, header, or known signal.

10. An apparatus for generating an encryption key, comprising:
a sensor module comprising at least one sensor;
a transceiver module;
a processor configured to initiate simultaneous sensor information collection for at least two devices, the at least two devices are collocated, the simultaneous sensor information is captured according to a collection pattern, the simultaneous sensor information for the at least two devices is captured independently for each device, the simultaneous sensor information is independently stored at each device, and the simultaneous sensor information used for security purposes is not communicated between the two devices, to create an encryption key based on the non-communicated simultaneous sensor information, and to use the encryption key to securely communicate between the at least two devices; and
a memory module.

11. The apparatus of claim 10, wherein the collection pattern comprises any combination of the following: type of sensors used, the number of sensors used, the sensor stimulus, the timing, capture period, uses of preambles, and conditions to collecting.

12. The apparatus of claim 10, further comprising:
synchronizing the stored simultaneous sensor information until a match exists between the stored sensor information for the at least two devices.

13. The apparatus of claim 10, wherein the simultaneous sensor information is used for: an application that uses secure data, sessions keys, authorization, personal signing, digital signatures, codes, security keys, authentication, access, physical access, system or data access, online access, computer log in, data protection, encryption, decryption, Advanced Encryption Standard (AES), Data Encryption Standard (DES), Public Key Infrastructures (PKI), or One-Time-Pads (OTP).

14. A non-transitory computer readable medium encoded with processing instructions, for generating an encryption key, comprising:
code to initiate simultaneous sensor information collection for at least two devices, the at least two devices are collocated, the simultaneous sensor information is captured according to a collection pattern;
code to obtain simultaneous sensor information for the at least two devices, the simultaneous sensor information for the at least two devices is captured independently for each device, the simultaneous sensor information is independently stored at each device, and the simultaneous sensor information used for security purposes is not communicated between the two devices
code to create an encryption key based on the non-communicated simultaneous sensor information; and
code to use the encryption key to securely communicate between the at least two devices.

15. The computer readable medium of claim 14, wherein the collection pattern comprises any combination of the following: type of sensors used, number of sensors used, sensor stimulus, timing, capture period, uses of preambles, and conditions to collecting.

16. The computer readable medium of claim 14, wherein the simultaneous sensor information is used for:
an application that uses secure data, sessions keys, authorization, personal signing, digital signatures, security keys, authentication, access, physical access, system or data access, codes, online access, computer log in, data protection, encryption, decryption, Advanced Encryption Standard (AES), Data Encryption Standard (DES), Public Key Infrastructures (PKI), or One-Time-Pads (OTP).

17. The method of claim 1, the independently stored simultaneous sensor information at the at least two devices comprises a statistical match prior to synchronization.

18. The apparatus of claim 10, the independently stored simultaneous sensor information at the at least two devices comprises a statistical match prior to synchronization.

19. The computer readable medium of claim 14, further comprising:
synchronizing the stored simultaneous sensor information until a match exists between the stored simultaneous sensor information for the at least two devices.

* * * * *